UNITED STATES PATENT OFFICE.

JOHN LATTIMORE CARPENTER, OF PALMERTON, PENNSYLVANIA.

PROCESS FOR MANUFACTURING CALCIUM SULFATE-ZINC SULFID PIGMENT.

1,146,690. Specification of Letters Patent. Patented July 13, 1915.

No Drawing. Application filed July 1, 1913. Serial No. 776,786.

*To all whom it may concern:*

Be it known that I, JOHN LATTIMORE CARPENTER, a citizen of the United States, and a resident of Palmerton, in the county of Carbon and State of Pennsylvania, have invented a new and Improved Process for Manufacturing Calcium Sulfate-Zinc Sulfid Pigment, of which the following is a full, clear, and exact description.

My invention relates to the manufacture of a compound spoken of as calcium sulfate-zinc sulfid pigment, and has reference more particularly to a process of obtaining the said compound from a solution of calcium chlorid by treating the same with an alkali sulfid and an appropriate zinc salt.

An object of the invention is to provide a simple and inexpensive process for the manufacture of calcium sulfate-zinc sulfid pigment by precipitating the same as a white substance from a solution of calcium chlorid by suitable reagents.

Another object of the invention is to obtain a product expressed substantially by the formula: $CaSO_4.ZnS$, in which the ratio of calcium sulfate to zinc sulfid in the expression stated can be varied.

My process of manufacturing calcium sulfate-zinc sulfid pigment is primarily intended for the utilization of calcium chlorid obtained as a by-product in certain industries, but it is self-evident that any solution of calcium chlorid in water can be used in my process.

The process consists in bringing together a solution of calcium chlorid, a solution of a soluble sulfid, or its products of hydrolysis, and a solution of zinc salt, thus forming a white precipitate. This precipitate can then be treated in proper ways (which do not form part of my process) so it may be used as a pigment, rubber filler, etc.

While the ratio of $CaSO_4$ to ZnS in the final product is independent of the order of addition of the solutions specified, I prefer to use the following order: The soluble sulfid solution I prefer to use is a solution of sodium sulfid which is run into the calcium chlorid solution until the latter is just alkaline, then the sodium sulfid solution, and a zinc salt solution, which is preferably a zinc sulfate solution, are run into the calcium chlorid solution, each at a rate dependent upon its concentration and at such a rate that the slight alkalinity in the calcium chlorid solution persists during the formation of the precipitate. The reaction can be expressed substantially as follows:

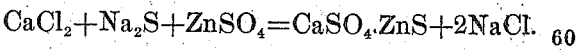

$$CaCl_2 + Na_2S + ZnSO_4 = CaSO_4.ZnS + 2NaCl.$$

The precipitate formed contains calcium sulfate or a hydrated modification of the same or both, which is somewhat soluble in water and in water containing sodium chlorid, and, as seen from the reaction, the liquid remaining after the precipitation carries sodium chlorid in solution, hence a quantity of the calcium salt would be dissolved. To lessen the solution of $CaSO_4$ during the formation of the white precipitate and during contact with the liquid, I use some easily soluble surfate, such as sodium sulfate or sulfuric acid, which is added to the calcium chlorid solution previous to its treatment with the soluble sulfid. A sufficient quantity of sulfuric acid is added to the calcium chlorid solution to make the same saturated with calcium sulfate, but not enough to cause noticeable precipitation of the same. The solution of calcium chlorid so saturated with calcium sulfate is then treated with sodium sulfid and zinc sulfate, as stated.

If it is desired to increase the proportion of calcium sulfate in the white precipitate expressed substantially by the formula $CaSO_4.ZnS$, a soluble sulfate, preferably sulfuric acid is added to the calcium chlorid solution until the desired quantity of calcium sulfate precipitate is obtained, then solutions of sodium sulfid and zinc sulfate are added in such ratios that the deposit formed during this addition is expressed substantially by the formula $CaSo_4.ZnS$ in addition to the calcium sulfate previously deposited.

If it is desired to increase the proportion of zinc sulfid in the white precipitate, it is accomplished by running into the precipitating tank containing the white precipitate, expressed substantially by the formula $CaSo_4.ZnS$, both a sulfid solution and a zinc solution until any calculated quantity of zinc sulfid is precipitated. Thus, by my process a white precipitate may be obtained carrying any ratio of calcium sulfate to zinc sulfid.

Having thus described my invention, I claim as new and desire to secure by Letters Patent:

1. A process for manufacturing calcium sulfate-zinc sulfid pigment consisting in treating a solution of calcium chlorid with a sulfid of an alkaline metal and a zinc salt containing the radicle $SO_4$ substantially as set forth.

2. A process for manufacturing calcium sulfate-zinc sulfid pigment consisting in treating a solution of calcium chlorid with an alkali sulfid and zinc sulfate.

3. A process for manufacturing calcium sulfate-zinc sulfid pigment consisting in treating a solution of calcium chlorid with sodium sulfid and zinc sulfate substantially as set forth.

4. A process for manufacturing calcium sulfate-zinc sulfid pigment consisting in forming a precipitate by treating a solution of calcium chlorid with an alkali sulfid until the solution is just alkaline, then adding simultaneously to the said solution zinc sulfate and an additional quantity of alkali sulfid in such a ratio that the alkalinity in the chlorid solution will persist during the formation of the precipitate.

5. A process for manufacturing calcium sulfate-zinc sulfid pigment consisting in treating a solution of calcium chlorid with sodium sulfid until the solution of calcium chlorid is just alkaline, then adding simultaneously zinc sulfate and an additional quantity of sodium sulfid in such ratios that the alkalinity in the solution of calcium chlorid will persist during the precipitation.

6. A process for manufacturing calcium sulfate-zinc sulfid pigment consisting in forming a precipitate by treating a solution of calcium chlorid with a compound containing the radicle $SO_4$ which will not react in the presence of a soluble sulfid to form an insoluble sulfid, to cause the calcium chlorid solution to become saturated with calcium sulfate without noticeable precipitation of the same, then adding an alkali sulfid until the solution of calcium chlorid is just alkaline, then adding simultaneously to the said solution zinc sulfate and an additional quantity of alkali sulfid each at a rate dependent upon its concentration and at such a rate that the slight alkalinity in the calcium chlorid solution persists during the formation of a precipitate from said solution.

7. A process for manufacturing calcium sulfate-zinc sulfid pigment consisting in forming a precipitate by treating a solution of calcium chlorid with sulfuric acid to cause the calcium chlorid solution to become saturated with calcium sulfate without noticeable precipitation of the same, then adding a solution of an alkali sulfid until the solution of calcium chlorid is just alkaline, then adding simultaneously to the said solution zinc sulfate an additional quantity of alkali sulfid each at a rate dependent upon its concentration and at such a rate that the slight alkalinity of the calcium chlorid solution persists during the formation of the precipitate from said solution.

8. A process for manufacturing calcium sulfate-zinc sulfid pigment consisting in forming a precipitate by treating a solution of calcium chlorid with sulfuric acid to cause the calcium chlorid solution to become saturated with calcium sulfate without noticeable precipitation of the same, then adding sodium sulfid until the solution of calcium chlorid is just alkaline, then adding simultaneously to the said solution zinc sulfate and an additional quantity of sodium sulfid each at a rate dependent upon its concentration and at such a rate that a slight alkalinity in the calcium chlorid solution persists during the formation of the precipitate from said solution.

9. A process for manufacturing calcium sulfate-zinc sulfid pigment consisting in forming a precipitate by treating a solution of calcium chlorid with a compound containing the $SO_4$ radicle which will not react in the presence of a soluble sulfid to form an insoluble sulfid, to cause the calcium chlorid solution to become saturated with calcium sulfate, but not enough to cause noticeable precipitation, then adding to the solution of calcium chlorid an alkali sulfid until the said solution is just alkaline, then adding simultaneously to the solution of calcium chlorid zinc sulfate an additional quantity of alkali sulfid each at a rate dependent upon its concentration and at such a rate that the slight alkalinity in the calcium chlorid solution persists until complete precipitation, then adding further alkali sulfid and zinc sulfate until a predetermined quantity of zinc sulfid is precipitated in addition to the precipitate previously formed.

10. A process for manufacturing calcium sulfate-zinc sulfid pigment consisting in forming a white precipitate by treating a solution of calcium chlorid with sulfuric acid and causing the calcium chlorid solution to become saturated with calcium sulfate but not enough to cause noticeable precipitation, then adding to the solution of calcium chlorid sodium sulfid until the calcium chlorid solution is just alkaline, then adding simultaneously to the solution of calcium chlorid the zinc sulfate and an additional quantity of sodium sulfate each at a rate depending upon its concentration and at such a rate that the slight alkalinity in the calcium chlorid solution persists until complete precipitation of a white substance, then adding further sodium sulfid and zinc sulfate until a predetermined quantity of zinc sulfid is precipitated in addition to the white precipitate previously formed.

In testimony whereof I have signed my name to this specification in the presence of two subscribing witnesses.

JOHN LATTIMORE CARPENTER.

Witnesses:
D. D. VAN MATER,
FELIX LAYAT.